United States Patent
Sjödin et al.

(10) Patent No.: US 11,059,092 B2
(45) Date of Patent: Jul. 13, 2021

(54) METHOD FOR JOINING HEAT TRANSFER PLATES OF A PLATE HEAT EXCHANGER

(71) Applicant: ALFA LAVAL CORPORATE AB, Lund (SE)

(72) Inventors: Per Sjödin, Lund (SE); Kristian Walter, Genarp (SE)

(73) Assignee: ALFA LAVAL CORPORATE AB, Lund (SE)

( * ) Notice: Subject to any disclaimer, the term of this patent is extended or adjusted under 35 U.S.C. 154(b) by 115 days.

(21) Appl. No.: 16/080,486

(22) PCT Filed: Mar. 20, 2017

(86) PCT No.: PCT/EP2017/056531
§ 371 (c)(1),
(2) Date: Aug. 28, 2018

(87) PCT Pub. No.: WO2017/167597
PCT Pub. Date: Oct. 5, 2017

(65) Prior Publication Data
US 2019/0030654 A1    Jan. 31, 2019

(30) Foreign Application Priority Data
Mar. 31, 2016  (EP) ..................................... 16163335

(51) Int. Cl.
*B21D 53/04*    (2006.01)
*F28D 9/00*    (2006.01)
(Continued)

(52) U.S. Cl.
CPC ............ *B21D 53/04* (2013.01); *B23K 35/001* (2013.01); *B23K 35/0222* (2013.01);
(Continued)

(58) Field of Classification Search
CPC ................ B23K 35/34; B23K 35/0222; B23K 35/0244–025; B23K 1/0012;
(Continued)

(56) References Cited

U.S. PATENT DOCUMENTS

| 5,287,918 A | 2/1994 | Banks et al. |
| 2004/0181941 A1 | 9/2004 | Johannes Rassmus et al. |

(Continued)

FOREIGN PATENT DOCUMENTS

| CN | 101796286 A | 8/2010 |
| CN | 104302440 A | 1/2015 |

(Continued)

OTHER PUBLICATIONS

Office Action with Search Report dated Sep. 2, 2019, by the Swedish Patent and Registration Office in corresponding Swedish Patent Application No. 1851229-3. (7 pages).

(Continued)

*Primary Examiner* — Matthew P Travers
(74) *Attorney, Agent, or Firm* — Buchanan Ingersoll & Rooney PC

(57) ABSTRACT

A method for joining heat transfer plates, comprising: applying a melting depressant composition on individual application areas of a first metal sheet, each application area comprising a mid-section and two end-sections; pressing ridges and grooves in the metal sheet, the ridges extending in a direction that extends between the end-sections of the application areas, such that the application areas are located on top of the ridges; bringing the metal sheet into contact with a second, pressed metal sheet, such that contact points are formed where the mid-sections of the application areas relocated; heating the sheets until melted metal is formed at the application areas where the melting depressant compo- (Continued)

sition is applied; and allowing the melted metal to solidify such that a joint is obtained at the contact points.

19 Claims, 4 Drawing Sheets

(51) Int. Cl.
  *B23K 35/02* (2006.01)
  *B23K 35/24* (2006.01)
  *B23K 35/00* (2006.01)
  *B23P 15/26* (2006.01)
  *F28F 3/04* (2006.01)
  *B23K 35/32* (2006.01)

(52) U.S. Cl.
  CPC ............ *B23K 35/24* (2013.01); *B23K 35/325* (2013.01); *B23P 15/26* (2013.01); *F28D 9/005* (2013.01); *F28D 9/0025* (2013.01); *F28F 3/046* (2013.01); *B23K 35/00* (2013.01); *B23K 35/0233* (2013.01); *B23K 35/0244* (2013.01); *F28F 2275/045* (2013.01)

(58) Field of Classification Search
  CPC ...... B23K 2101/14; F28F 2275/04–045; F28F 2275/061; F28F 3/046; F28D 9/005; F28D 9/0025; B23P 15/26; B21D 53/04
  See application file for complete search history.

(56) References Cited

U.S. PATENT DOCUMENTS

| | | | |
|---|---|---|---|
| 2010/0206534 A1 | 8/2010 | Amaya et al. | |
| 2015/0034286 A1* | 2/2015 | Sjodin | B23K 35/02 165/166 |
| 2015/0041110 A1 | 2/2015 | Ito | |
| 2015/0060030 A1* | 3/2015 | Sjodin | B23K 1/00 165/166 |
| 2016/0341484 A1* | 11/2016 | Wei | F28D 9/005 |
| 2017/0176047 A1* | 6/2017 | Kondo | B23P 15/26 |

FOREIGN PATENT DOCUMENTS

| | | |
|---|---|---|
| EP | 2 574 420 A1 | 4/2013 |
| EP | 2837905 A1 | 2/2015 |
| EP | 2853333 A1 | 4/2015 |
| EP | 2886997 A1 | 6/2015 |
| EP | 2957851 A1 | 12/2015 |
| EP | 3 078 929 A1 | 10/2016 |
| JP | S61-176435 A | 8/1986 |
| JP | H04-227481 A | 8/1992 |
| JP | 09178384 A | 7/1997 |
| JP | 2000337789 A | 12/2000 |
| WO | 2009/123516 A1 | 10/2009 |
| WO | 2013/080256 A1 | 6/2013 |
| WO | 2013/135866 A1 | 9/2013 |
| WO | 2013144211 A1 | 10/2013 |
| WO | 2015/043944 A1 | 4/2015 |
| WO | 2015062992 A1 | 5/2015 |
| WO | 2016162168 A1 | 10/2016 |

OTHER PUBLICATIONS

Office Action (Notice of Reasons for Rejection) dated Sep. 2, 2019, by the Japanese Patent Office in corresponding Japanese Patent Application No. 2018-548919 and an English Translation of the Office Action. (9 pages).
International Search Report (PCT/ISA/210) dated May 4, 2017, by the European Patent Office as the International Searching Authority for International Application No. PCT/EP2017/056531.
Written Opinion (PCT/ISA/237) dated May 4, 2017, by the European Patent Office as the International Searching Authority for International Application No. PCT/EP2017/056531.
European Search Report dated Apr. 17, 2019, by the European Patent Office in corresponding European Patent Application No. 19 160 047.7. (7 pages).
An English Translation of the First Office Action dated Apr. 17, 2020 by the National Intellectual Property Administration, P. R. China in corresponding Chinese Patent Application No. 201780021321. 1. (7 pages).

* cited by examiner

METHOD FOR JOINING HEAT TRANSFER PLATES OF A PLATE HEAT EXCHANGER

TECHNICAL FIELD

The invention relates to a method for joining heat transfer plates of a plate heat exchanger by using a melting depressant composition. A plate heat exchanger that is manufactured by the method is also described.

BACKGROUND ART

Today plate heat exchangers with permanently joined plates are often manufactured by brazing or welding the plates to each other. Brazing is done by applying a brazing material on the plates and by heating the plates such that the brazing material melts and forms joints between the plates. The brazing material includes a so called filler metal, and it is this metal that forms the joints that joins the plates. As for all brazing techniques of this type, the brazing material includes a melting depressant composition that causes the filler metal to melt at a temperature that is lower than the melting temperature of the plates that are joined to each other.

The filler metal and the melting depressant components typically have the form of metal powders. To bind the metal powder, the brazing material typically also includes a binder composition that gives the brazing material the form of a paste or a liquid that may be sprayed, painted or in another suitable way applied on the plates. It is important that the brazing material is properly applied on the plates, in the correct amounts and on the correct places.

Other techniques for manufacturing plate heat exchangers exist, such as those that employ a melting depressant composition that melts a surface layer of the heat transfer plates of the plate heat exchanger, where the melted surface layer then flows, by capillary action, to contact points between the plates where it is allowed to solidify and thereby form joints. An example of such techniques, often referred to as "self-brazing" techniques, is described in patent document WO2013/144211. For self-brazing techniques it is important that the melting depressant composition is properly applied on the plates, in the correct amounts and on the correct places.

Applying the melting depressant composition is an operation that involves a risk of introducing errors and faults in the process of joining the heat transfer plates. Thus, it is estimated that there is a need for improving the process of applying the melting depressant composition in self-brazing techniques.

SUMMARY

It is an object of the invention to improve self-brazing techniques in respect of how melting depressant composition is applied. In particular, it is an object to find a more optimal distribution of the melting depressant composition, when applied on a heat transfer plate.

To solve these objects a method for joining heat transfer plates of a plate heat exchanger is provided. The method comprises: applying a melting depressant composition on a surface of a metal sheet and in a pattern on the metal sheet, the pattern comprising a number of individual application areas where the melting depressant composition is applied, each application area comprising a mid-section, and a first end section and a second end-section that are located on a respective side of the mid-section; pressing a number of ridges and grooves in the metal sheet, the ridges extending in a direction that extends from the first end-section to the second end-section of the application areas, such that the application areas are located on top of and along the ridges. When the metal sheet has been pressed it is often referred to as a heat transfer plate. The pressed metal sheet (heat transfer plate) is brought into contact with a second, pressed metal sheet (heat transfer plate), such that contact points are formed between the sheets where the mid-sections of the application areas are located. The first and second metal sheets are then heated until said surface of the first metal sheet melts and forms melted metal at the areas where the melting depressant composition is applied, at the contact points between the sheets. The melted metal layer is then allowed to solidify, such that a joint is obtained at the contact points.

The method is advantageous in that individual application areas are applied with the melting depressant composition, since this causes melted metal to be formed only at these areas, which in turn prevents other areas from potentially becoming weaker. As a result the joints between the sheets become stronger.

According to another aspect a plate heat exchanger is provided, which comprises a first heat transfer plate that is joined with a second heat transfer plate according to the above described method or any of its embodiments.

Other objectives, features, aspects and advantages of the method and the plate heat exchanger will appear from the following detailed description as well as from the drawings.

BRIEF DESCRIPTION OF THE DRAWINGS

Embodiments of the invention will now be described, by way of example, with reference to the accompanying schematic drawings, in which.

DETAILED DESCRIPTION

Figure 1:
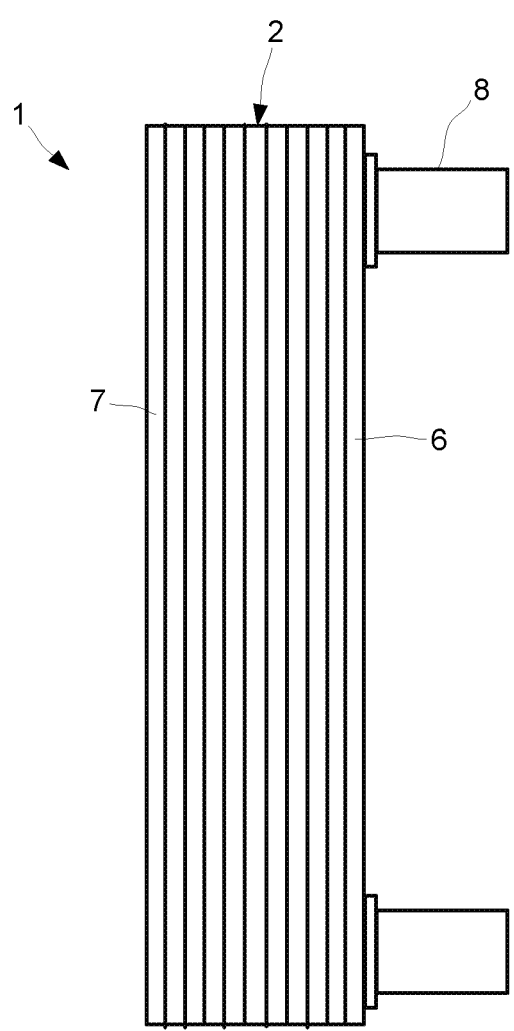
FIG. 1 is a side view of a plate heat exchanger.
Figure 2:
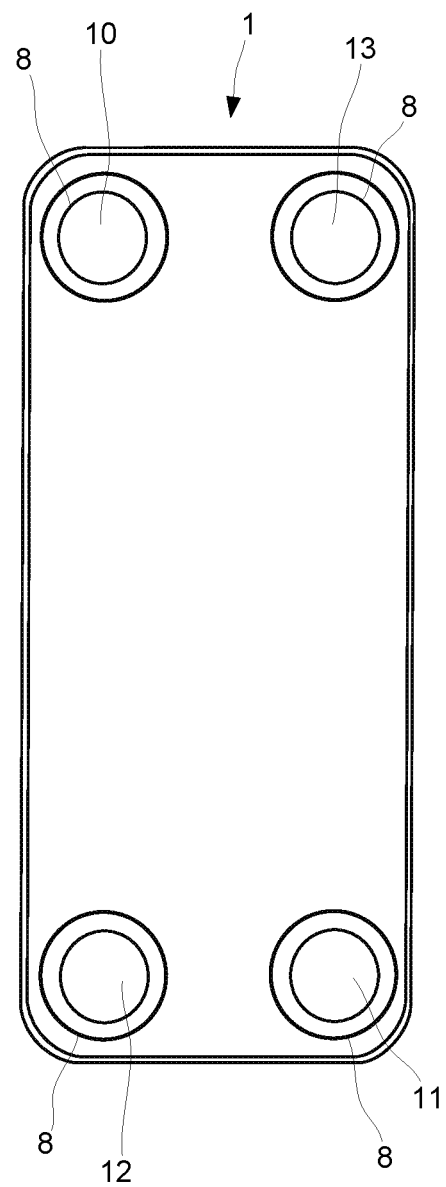
FIG. 2 is a top view of the plate heat exchanger of FIG. 1.

With reference to FIGS. 1 and 2 a plate heat exchanger 1 is illustrated. The plate heat exchanger 1 is made of metal, such as stainless steel, titanium or any other metal that may be used for a plate heat exchanger. The plate heat exchanger 1 comprises a stack 2 of heat transfer plates, and a first end plate 6 that is arranged on a first side of the stack 2 and a second end plate 7 that is arranged on a second side of the stack 2. The end plates 6, 7 have the same shape and form as the heat transfer plates in the stack 2, but are slightly thicker for providing protection against external forces.

The stack 2 of heat transfer plates are permanently joined to each other to form the plate stack 2 and has alternating first and second flow paths for a first fluid and a second fluid that flow in between the heat transfer plates. The plate heat exchanger 1 has a first fluid inlet 10 and a first fluid outlet 11. The first fluid inlet 10 receives the first fluid and leads the first fluid to the first flow path between the heat transfer plates in the plate stack 2. The first fluid outlet 11 receives the first fluid from the first flow path and allows the fluid to exit the plate heat exchanger 1. The plate heat exchanger 1 has a second fluid inlet 12 and a second fluid outlet 13. The second fluid inlet 12 receives the second fluid and leads the second fluid to the second flow path between the heat transfer plates. The second fluid outlet 13 receives the second fluid from the second flow path and allows the second fluid to exit the plate heat exchanger 1.

Connectors 8 are arranged around each of the inlets and the outlets, and each connector 8 has the form a pipe. Fluid lines for the two fluids may then be connected to the plate heat exchanger 1 via the connectors 8. Any suitable technique may be used for accomplishing such connection, and the connectors 8 are typically made of the same material as the heat transfer plates in the stack 2. Inlets and outlets for one of the fluids me be reversed, such that there is a co-current flow of the fluids.

Figure 3:
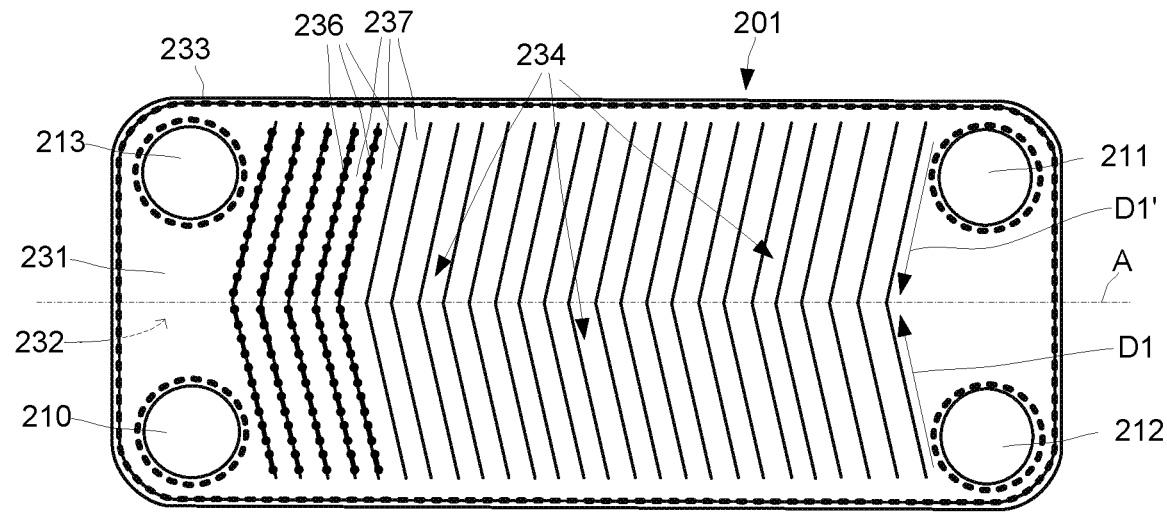
FIG. 3 is a top view of a pressed and cut heat transfer plate that is part of the plate heat exchanger of FIG. 1.

With reference to FIG. 3 a heat transfer plate 201 that is used for the plate heat exchanger 1 is illustrated. The heat transfer plate 201 is also referred to as a metal sheet 201. All heat transfer plates in the stack 2 may be identical to the heat transfer plate 201 of FIG. 3, apart from the end plates 6, 7 which are thicker. The heat transfer plates are arranged on top of each other, with every second heat transfer plate turned 180° around a normal direction of a plane that is parallel to the heat transfer plate 201. It is also possible to use two different heat transfer plates, where the different heat transfer plates are stacked alternatively on each other. The heat transfer plate 201 has four through holes 210-213, also referred to as port openings, which are aligned with the inlets and outlets 10-13 of the plate heat exchanger 1. A pattern 234 in form of alternating tops 236 and grooves 237 is pressed into the heat transfer plate 201. The pattern 234 forms a heat transfer area 234 of the heat transfer plate 201. The heat transfer plate 201 has a first side 231, or surface 231, and a second side 232, or surface 232, that is opposite the first side 231. A peripheral edge 233 extends around the heat transfer plate 201 and is folded from the first side 231 towards the second side 232. The edge 233 abuts an underlying heat transfer plate and provides a seal to the periphery to the underlying heat transfer plate.

Figure 4:
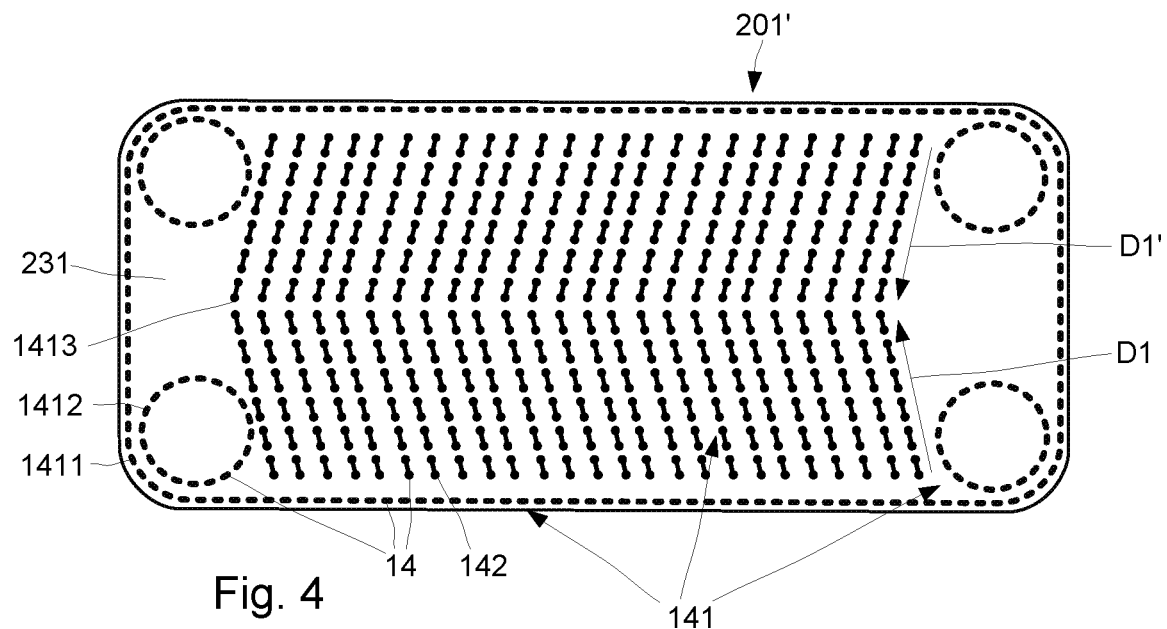
FIG. 4 is a top view of the heat transfer plate of FIG. 3, before it has been pressed and cut.

The forms and shapes of the plate heat exchanger 1, the fluid paths for the fluids, the heat transfer plates 201 and the connectors 8 are per se known within the art and can be accomplished according to known techniques. However, the plate heat exchanger 1 is produced in a new manner, by using a melting depressant composition 14 with special properties that effectively joins the heat transfer plates in the stack 2. Before the pattern 234 is pressed and the through holes 210-213 and the edge 233 of the heat transfer plate 201 have been formed, the heat transfer plate 201 has the form of a flat heat transfer plate 201', or metal sheet 201', as illustrated by FIG. 4. The heat transfer plate 201' is made of metal and the melting depressant composition 14 is applied the surface 231 of the heat transfer plate 201' before it is pressed and cut. Reference numeral 201' indicates the same plate as the plate with reference numeral 201, but before it is pressed and cut.

In detail and with reference to FIG. 4 the melting depressant composition 14 is applied on the surface 231 of the of a first metal sheet 201', on the first side 231 of the metal sheet 201'. The melting depressant composition 14 is applied in a pattern 141 on the first metal sheet 201'. As may be seen the pattern 141 comprises a number of individual application areas 142. In detail, the pattern 141 comprises an edge application group 1411 where the melting depressant composition is applied just inside the peripheral edge 233 of the metal sheet 201', four port application groups 1412 where the melting depressant composition is applied around the port openings 210-213, and a heat transfer application group 1413 where the melting depressant composition is applied in a so called fish-bone pattern. The application groups 1411, 1412, 1413 may be seen in both FIG. 4 and FIG. 3, but only a part of the heat transfer application group 1413 is illustrated in FIG. 3. Each application group 1411, 1412, 1413 comprises a number of individual application areas, such as the individual application areas 142 of the heat transfer application group 1413.

Figure 7A:
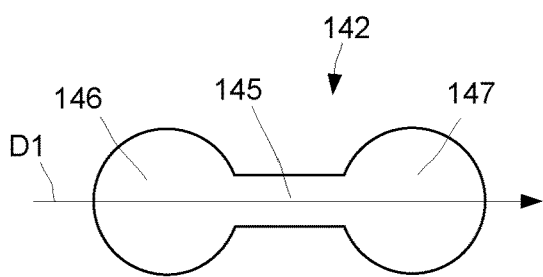
FIGS. 7*a*-7*e* are enlarged top views of different shapes of application areas where a melting depressant composition is applied.
Figure 7B:
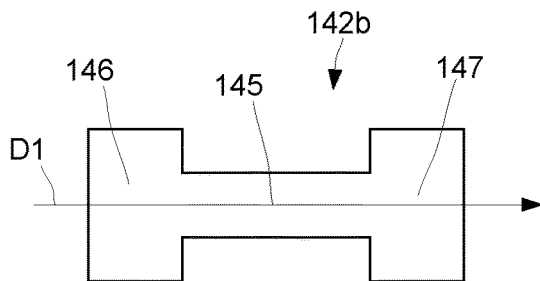
Figure 7C:
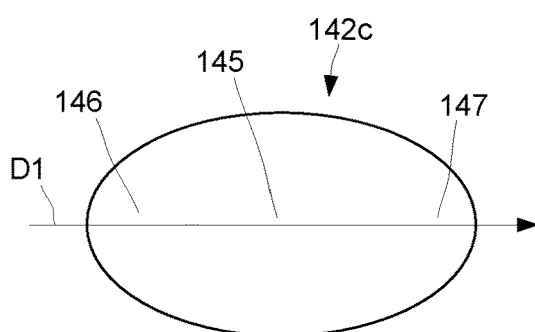
Figure 7D:
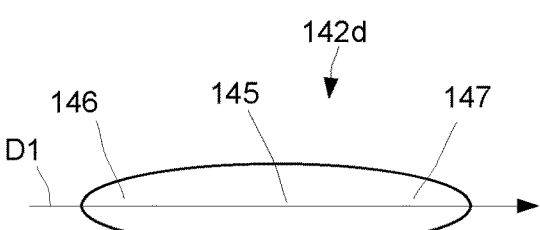
Figure 7E:
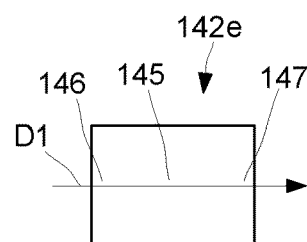

The individual application areas 142 of the heat transfer application group 1413 are preferably physically separated from each other, and, with further reference to FIG. 7a, the individual application areas 142 comprises a mid-section 145, a first end section 146 and a second end-section 147. The first end section 146 and the second end-section 147 are located on a respective side of the mid-section 145. Each application area 142 has an elongated shape that extends in a direction D1 from the first end-section 146 to the second end-section 147. The application area 142 has a length in the direction D1 that is at least three times greater, or even five times greater, than its width at the mid-section 145. The width of the mid-section 145 is measured in a direction that is perpendicular to the direction D1. A width of the end-sections 146, 147 may be greater than a width of the mid-section 145. Each width of the sections 145, 146, 147 is measured along a direction that is perpendicular to the direction D1. The width an individual end-section 146, 147 may be at least 50% wider than the width of the mid-section 145.

Turning back to FIG. 3 the ridges 236 and grooves 237 of the pressed and cut plate 201 of FIG. 3 extend in the direction D1 that extends from the first end-section 146 to the second end-section 147 of the application areas 142. In the illustrated example the application areas 142 are arranged in a fish-bone pattern, with the result that there are two directions D1, D1' that extend from first end-sections 146 to second end-sections 147 of the application areas 142. These directions D1, D1' are mirror images of each other, as seen relative an axis A that extends though the center of the plate 201, between the port openings 210-213. The pressing of the pattern 234 in the plate 201' is done such that the ridges 236 are located where the application areas 142 of the heat transfer application group 1413 are positioned. The application areas 142 are then located on top of and along the ridges 236. It can also be said the application areas 142 are located at positions where the ridges 236 will be located after the pattern 234 is pressed in the plate 201'. Pressing the pattern 234 and cutting the edges and the port openings 210-213 of the sheet 201' is done according to conventional pressing and cutting techniques that are commonly used for pressing heat transfer plates for plate heat exchangers.

The application areas 142 are thus applied on a location of the sheet 201' where a ridge shall be located after the pressing and with the ridge direction following the longitudinal extension D1 and D1' of the application areas 142. This results in that the ridges 236 thereby extend in the direction D1 or D1' that extends from the first end-section 146 to the second end-section 147 of the application areas 142, and that the application areas 142 then are located on top of and along the ridges 236.

The ridges 236 and grooves 237 form the heat transfer area 234 of the metal sheet 201, and maximum 50%, or maximum 40%, of the heat transfer area 234 is covered by the applied melting depressant composition 14. In one embodiment at least (i.e. a minimum of) 10%, or at least 20%, of the heat transfer area 234 is covered by the applied melting depressant composition 14.

The melting depressant composition 14 comprises a melting depressant component that comprises at least 25 wt % silicon, or at least 40 wt % silicon, or at least 60 wt % silicon, or at least 85 wt % silicon, for decreasing a melting temperature of the metal sheet 201', and optionally, a binder component for facilitating the applying of the melting depressant composition 14 on the surface 231. The melting depressant composition 14 function is to, when the sheet 201' is heated to a temperature just below its melting point, interact with the metal in the sheet 201' where the melting depressant composition 14 is applied, and cause a surface layer in the metal sheet 201' to melt. The melted metal is then used for forming joints, as will be described in more detail below.

Examples of suitable melting depressant compositions and how they may be applied and of which metal the sheet 201' may be made of can be found in patent document WO2013144211. Generally, the melting depressant composition 14 is given a liquid form by using a binder composition and the application may be accomplished by conventional screen printing on a metal surface. Typically the melting depressant composition 14 comprises less than 50 wt % metallic elements, or less than 10 wt % metallic elements. The calculation of how much wt % metallic elements there is in the melting depressant composition 14 excludes a weight of any binder component that might be used. The calculation is based on elements in the melting depressant composition that from part of the joints, i.e. that remains on the sheet 201' after any binder composition as evaporated.

Other examples of melting depressant compositions and metal for the sheet 201' may be found in International patent application No. PCT/EP2016/055296, where the metal sheet is made of titanium and the melting depressant comprises various combinations of copper, nickel and zirconium. For this combination of metals and melting depressant compositions the application of the melting depressant compositions may be performed by placing them on the individual application areas and by e.g. rolling the sheet so that the melting depressant compositions becomes attached to the titanium sheet. Alternatively the copper, nickel and/or zirconium may have the form of powder, which the acts a melting depressant component of the melting depressant composition. This melting depressant component may then be mixed with a binder component, so that it may be screen printed on the individual application areas.

The heat transfer plates in the stack 2 are made of metal sheets like the sheet 201 of FIG. 3. Every second heat transfer plate is rotated 180° around a normal direction of the plate (e.g. turned 180° clockwise, as seen in FIG. 3), and when the plates are stacked on top of each other to form the stack 2, then the ridges 236 of an underlying plate abuts the grooves 437 of the plate above. Every such abutment forms a contact point between the plates. Exactly where the contact points are located depends on the form and shape of the ridges and grooves, and the individual application areas 142 are positioned on the metal sheet where the contact points are located.

Figure 5:
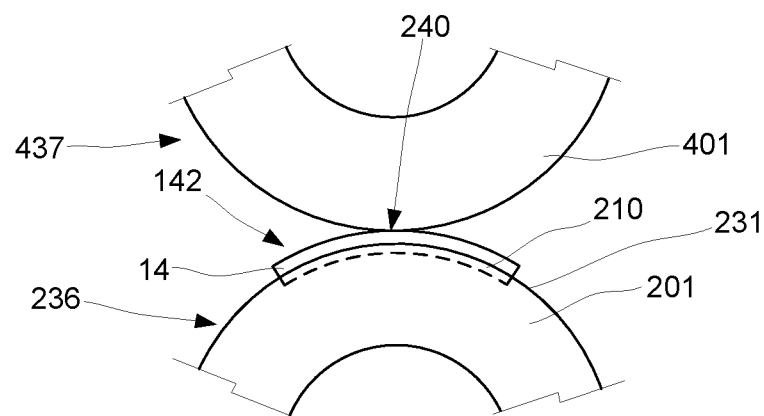
FIG. 5 is an enlarged, partial view of two heat transfer plates of the plate heat exchanger of FIG. 1, before they are joined.
Figure 6:
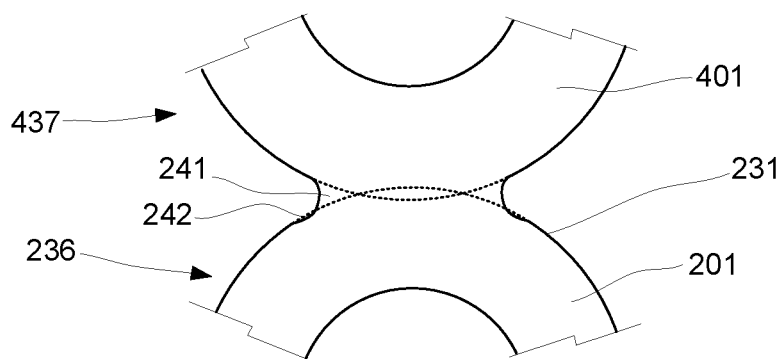
FIG. 6 is an enlarged, partial view of the heat transfer plates of FIG. 5, after they are joined.

With further reference to FIGS. 5 and 6, when one pressed metal sheet 201 is brought into contact with a second, pressed metal sheet 401 that form part of the stack 2, then a contact point 240 is formed between the metal sheets 201, 401 where the application area 142 is located. Sheet 401 is in the illustrated example identical to the sheet 201, but rotated 180° as described above. Preferably the mid-section 145 of the application areas 142 is located at the contact point 240. Corresponding contact points are formed for all application areas 142 in the heat transfer application group 1413.

When the stack 2 is heated to a temperature just below the melting temperate of the metal the sheets 201, 401 are made of, then the melting depressant composition 14 causes the surface 231 of the first metal sheet 201 to melt and form a melted metal layer 210 at the area 142 where the melting depressant composition 14 is applied, i.e. at the contact point 240 between the sheets 201, 401. The melted metal then flows, by way of capillary action, to the contact point 240 where it is allowed to solidify when the temperature is decreased. A joint 241 is then formed obtained at the location of the contact point 240. This happens for all contact points where melting depressant composition 14 is applied. Since the metal of the joint 241 is taken from the sheet 201 where the melting depressant composition 14 was applied, a small depression 242 becomes formed around the joint 241. Some metal of the joint 241 may be taken from the other sheet 401, since the melting depressant composition 14 is in contact with this sheet 401 as well. The vast majority of the metal is however taken form the sheet 201 on which the melting depressant composition 14 was applied. In any case, the joint 241 comprises at least 50 wt %, or at least 70 wt %, or even at least 80 wt % metal that, before the heating that melted the surface 231 of the first metal sheet 201, was part of any of the first metal sheet 201 and the second metal sheet 401.

The extension of the melting depressant composition 14 along the ridges is advantageous in that it weakens the sheet 201 less than when metal is uniformly taken from around the contact point, i.e. it is from a strength perspective better to draw metal from areas that are in line with the longitudinal direction of the ridge, than from areas that are transverse the direction of the ridge.

With reference to FIGS. 7a-7e some examples of different shapes of the individual application areas 142 are illustrated. FIG. 7a shows the same shape is in FIGS. 3 and 4 while FIGS. 7b-7e show other shapes of the individual application areas 142b, 142c, 142d and 142e. Each of the individual application areas 142, 142b, 142c, 142d and 142e comprises a mid-section 145, a first end section 146 and a second end-section 147, and they all have an elongated shape that extends in the direction D1 from the first end-section 146 to the second end-section 147.

Figure 8:
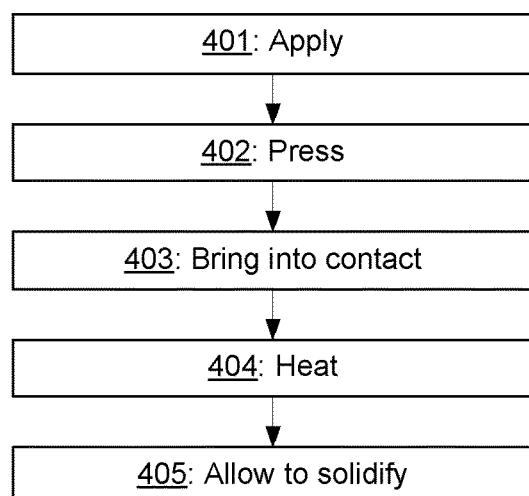
FIG. 8 is a flow chart that illustrates a method for joining heat transfer plates of the type shown in FIG. 3.

With reference to FIG. 8 a flow chart of a method for joining metal sheets, i.e. heat transfer plates, of the type shown in FIG. 3 is illustrated.

In a first step 401 the melting depressant composition 14 is applied on the surface 231 of the metal sheet 201' of FIG. 4, in the pattern 141 that has the individual application areas 142 that defines the areas where the melting depressant composition 14 is applied.

In a next step 402 a number of ridges 236 and grooves 237 are pressed in the first metal sheet 201', with the ridges 236 extending in the direction D1 that extends from the first end-section 146 to the second end-section 147 of the application areas 142. The application areas 142 are then located on top of and along the ridges 236. As described, other application areas also exist, such as around the port openings and along the perimeter of the sheet 201'. After the sheet 201' has been pressed, but also before the pressing, it is typically referred to as a heat transfer plate 201.

In a next step 403 the pressed heat transfer plate 201 is brought into contact with a second, pressed heat transfer plate 401, which the result that contact points 240 are formed between the heat transfer plates 201, 401 where the mid-sections 145 of the application areas 142 are located, on top of the ridges 236.

In a next step 404 the first and second heat transfer plates 201, 401 are heated until the surface 231 of the first heat transfer plate 201 melts and forms melted metal 210 at the areas 142 where the melting depressant composition 14 is applied.

In a next step 405 the melted metal layer 210 is allowed to solidify by decreasing the temperature, with the result that a joint 241 is obtained at the contact points 240.

Of course the steps of applying 401 melting depressant composition and pressing 402 the sheets is repeatedly performed until a desired number of heat transfer plates are obtained. The step of bringing 403 the pressed metal sheets in contact with each other is repeatedly performed until the desired number of heat transfer plates are stacked on top of each other.

The application 401 of the melting depressant composition, the composition of the melting depressant composition, the heating 404 that causes the metal to melt and the subsequent solidification 405 (cooling) may be performed according to the techniques described in patent document WO2013144211 or in International patent application No. PCT/EP2016/055296, depending on which metal is used for the heat transfer plates 201, 401 in the plate heat exchanger 1. Suitable metals are exemplified in patent document WO2013144211 and in International patent application No. PCT/EP2016/055296.

The steps of pressing 402 the sheet and bringing 403 sheets into contact with each other (stacking heat transfer plates), are performed according to conventional techniques and principles. The illustrated embodiment shows application areas 142 and ridges 236 that are arranged in a fish-bone pattern. Other patterns are conceivable, where the application areas 142 still extend along and on top of the ridges. The application areas 142 may be used with other, different shapes of application areas, but at least some of the application areas should be formed as above.

From the description above follows that, although various embodiments of the invention have been described and shown, the invention is not restricted thereto, but may also be embodied in other ways within the scope of the subject-matter defined in the following claims. In particular, the claims are not limited to a scope where all application areas are identical. Thus, "each application area" refers to each application area in a set of application areas, which set may be part of a larger set of application areas.

The invention claimed is:

1. A method for joining heat transfer plates of a plate heat exchanger, the method comprising
    applying a melting depressant composition on a surface of a first metal sheet and in a pattern on the first metal sheet, the pattern comprising a plurality of individual application areas where the melting depressant composition is applied, the plurality of individual application areas being spaced apart from one another, each application area comprising a mid-section, and a first end section and a second end-section that are located on a respective side of the mid-section, each of the plurality of application areas having an elongated shape that extends in a direction from the first end-section to the second end-section, each of the plurality of application areas having a length as measured in the direction from the first end-section to the second end-section, each of the plurality of application areas also having a width as measured in a direction perpendicular to the length, each of the plurality of application areas being configured so that the length of the application area is at least three times greater than the width of the application area at the mid-section of the application area,
    pressing a plurality of ridges and grooves in the first metal sheet, each of the plurality of ridges extending in the direction that extends from the first end-section to the second end-section of a plurality of the application areas, such that the application areas are located on top of and along the ridges, the pressing of the plurality of ridges and grooves in the first metal sheet occurring after the applying of the melting depressant composition on the surface of the first metal sheet, the pressing of the plurality of ridges and grooves in the first metal sheet resulting in a plurality of the application areas having the elongated shape being positioned on top of, and spaced apart along, each of the plurality of ridges,
    bringing the pressed first metal sheet into contact with a second, pressed metal sheet, such that contact points are formed between the metal sheets where the mid-sections of the application areas are located,
    heating the first and second metal sheets until said surface of the first metal sheet melts and forms melted metal at the areas where the melting depressant composition is applied, at the contact points between the sheets, and
    allowing the melted metal to solidify, such that joints are obtained at the contact points.

2. A method according to claim 1, wherein the length of each of the plurality of application areas is at least five times greater than the width of the application area at the mid-section of the application area.

3. A method according to claim 1, wherein the width of the first and second end-sections of each of the plurality of application areas is greater than the width of the mid-section of the application area.

4. A method according to claim 3, wherein the width of the first and second end-sections of each application area is at least 50% wider than the width of the mid-section of the application area.

5. A method according to claim 1, wherein the ridges and grooves form a heat transfer area of the metal sheet, and wherein maximum 50% of the heat transfer area is covered by the applied melting depressant composition.

6. A method according to claim 1, wherein the ridges and grooves form a heat transfer area of the metal sheet, and wherein minimum 20% of the heat transfer area is covered by the applied melting depressant composition.

7. A method according to claim 1, wherein the melting depressant composition comprises
    a melting depressant component that comprises at least 25 wt % silicon for decreasing a melting temperature of the first metal sheet, and
    a binder component.

8. A method according to claim 1, wherein the melting depressant composition comprises less than 50 wt % metallic elements.

9. A method according to claim 1, wherein each joint comprises at least 50 wt % metal that, before the heating, was part of any of the first metal sheet and the second metal sheet.

10. A method according to claim 1, wherein the melting depressant composition comprises
a melting depressant component that comprises at least 85 wt % silicon for decreasing a melting temperature of the first metal sheet, and
a binder component for facilitating the applying of the melting depressant composition on the surface.

11. A method according to claim 1, wherein the melting depressant composition comprises less than 10 wt % metallic elements.

12. A method according to claim 1, wherein each joint comprises at least 70 wt % metal that, before the heating, was part of any of the first metal sheet and the second metal sheet.

13. A method for joining heat transfer plates of a plate heat exchanger, the method comprising
applying a melting depressant composition on a surface of a first metal sheet and in a pattern on the first metal sheet, the pattern comprising a plurality of individual application areas where the melting depressant composition is applied, the plurality of individual application areas being spaced apart from one another so that regions devoid of melting depressant composition are located between the application areas, each of the plurality of application areas comprising a mid-section, a first end section and a second end-section, the first and second end sections of each of the plurality of application areas being located at opposite sides of the mid-section of the application area so that the mid-section of each of the plurality of application areas is positioned between the first and second end sections of the application area, each of the plurality of application areas having an elongated shape that is elongated in a direction from the first end-section to the second end-section, each of the plurality of application areas having a lenth as measured in the direction from the first end-section to the second end-section, each of the plurality of application areas also having a width as measured in a direction perpendicular to the length, the width of the first end-section of each of the plurality of application areas being greater than the width of the mid-section of the respetive application area;
pressing a plurality of ridges and grooves in the first metal sheet so that each of the plurality of ridges extends in the direction from the first end-section to the second end-section of several of the application areas, the pressing of the plurality of ridges and grooves in the first metal sheet occurring after the applying of the melting depressant composition on the surface of the first metal sheet, the pressing of the plurality of ridges and grooves in the first metal sheet resulting in a plurality of the application areas having the elongated shape being positioned on top of, and spaced aport along, each of the plurality of ridges;
bringing the pressed first metal sheet into contact with a second, pressed metal sheet, such that contact points are formed between the metal sheets where the mid-sections of the application areas are located;
heating the first and second metal sheets until said surface of the first metal sheet melts and forms melted metal at the areas where the melting depressant composition is applied, at the contact points between the sheets; and
allowing the melted metal to solidify, such that joints are obtained at the contact points.

14. A method according to claim 13, wherein, each of the plurality of application areas is configured so that the length of the application area is at least three times greater than the width of the application area at a mid-section of the application area.

15. A method according to claim 14, wherein the width of the first and second end-sections of each of the plurality of application areas is at least 50% wider than the width of the mid-section of the application area, as seen along the direction that extends from the first end-section to the second end-section.

16. A method according to claim 13, wherein the ridges and grooves form a heat transfer area of the metal sheet, and wherein a maximum 50% of the heat transfer area is covered by the applied melting depressant composition, and a minimum 20% of the heat transfer area is covered by the applied melting depressant composition.

17. A method for joining heat transfer plates of a plate heat exchanger, the method comprising
applying a melting depressant composition on a surface of a first metal sheet and in a pattern on the first metal sheet, the pattern comprising a plurality of individual application areas where the melting depressant composition is applied, the plurality of individual application areas being spaced apart from one another so that regions devoid of melting depressant composition are located between the application areas, each of the plurality of application areas comprising a mid-section, a first end section and a second end-section, the first and second end sections of each of the plurality of application areas being located at opposite sides of the mid-section of the application area so that the mid-section of each of the plurality of application areas is positioned between the first and second end sections of the application area, each of the plurality of application areas having an elongated shape that is elongated in a direction from the first end-section to the second end-section, each of the plurality of application areas having a length as measured in the direction from the first end-section to the second end-section, each of the plurality of application areas also having a width as measured in a direction perpendicular to the length, the width of the mid-section of each of the plurality of application areas being a smaller-width mid-section in which the width of the mid-section is smaller than the width of both the first end-section and the second end-section of the respective application area;
pressing a plurality of ridges and grooves in the first metal sheet so that each of the plurality of ridges extends in the direction from the first end-section to the second end-section of several of the application areas, the pressing of the plurality of ridges and grooves in the first metal sheet occurring after the applying of the melting depressant composition on the surface of the first metal sheet, the pressing of the plurality of ridges and grooves in the first metal sheet resulting in a plurality of the application areas having the elongated shape being positioned on top of, and spaced apart along, each of the plurality of ridges;
bringing the pressed first metal sheet into contact with a second, pressed metal sheet, such that contact points are formed between the metal sheets where the smaller-width mid-sections of the application areas are located;
heating the first and second metal sheets until said surface of the first metal sheet melts and forms melted metal at the areas where the melting depressant composition is applied, at the contact points between the sheets; and allowing the melted metal to solidify, such that joints are obtained at the contact points.

18. A method according to claim 17, wherein each of the plurality of application areas is configured so that the length of the application area is at least three times greater than the width of the application area at a mid-section of the application area.

19. A method according to claim 17, wherein the melting depressant composition comprises both a binder component and a melting depressant component that comprises at least 25 wt % silicon, and wherein no more than 50% of the heat transfer area is covered by the applied melting depressant composition.

* * * * *